United States Patent
Baker et al.

(10) Patent No.: US 11,227,125 B2
(45) Date of Patent: *Jan. 18, 2022

(54) TRANSLATION TECHNIQUES WITH ADJUSTABLE UTTERANCE GAPS

(71) Applicant: Dolby Laboratories Licensing Corporation, San Francisco, CA (US)

(72) Inventors: Jeffrey Baker, Thousand Oaks, CA (US); Sal Gregory Garcia, Camarillo, CA (US); Paul Anthony Long, Tarzana, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/594,971

(22) Filed: Oct. 7, 2019

(65) Prior Publication Data
US 2020/0143117 A1  May 7, 2020

Related U.S. Application Data

(63) Continuation of application No. 15/650,561, filed on Jul. 14, 2017, now Pat. No. 10,437,934, which is a continuation of application No. 15/277,897, filed on Sep. 27, 2016, now Pat. No. 9,747,282.

(51) Int. Cl.
| | |
|---|---|
| *G06F 40/58* | (2020.01) |
| *G06F 40/47* | (2020.01) |
| *G10L 15/26* | (2006.01) |
| *G10L 13/08* | (2013.01) |
| *G06F 40/263* | (2020.01) |
| *G10L 13/00* | (2006.01) |
| *H04R 1/10* | (2006.01) |
| *H04R 3/00* | (2006.01) |

(52) U.S. Cl.
CPC ............ *G06F 40/47* (2020.01); *G06F 40/263* (2020.01); *G06F 40/58* (2020.01); *G10L 13/08* (2013.01); *G10L 15/26* (2013.01); *G10L 13/00* (2013.01); *H04R 1/1083* (2013.01); *H04R 3/005* (2013.01); *H04R 2201/107* (2013.01)

(58) Field of Classification Search
CPC ................................................ G06F 40/40–51
See application file for complete search history.

(56) References Cited

U.S. PATENT DOCUMENTS

| | | |
|---|---|---|
| 6,266,642 B1 | 7/2001 | Franz |
| 6,473,859 B1 | 10/2002 | Enokida |
| 6,556,972 B1 | 4/2003 | Bakis |
| 6,743,859 B2 | 6/2004 | Kowaka |

(Continued)

OTHER PUBLICATIONS

Ferrer, L. et al "Is the Speaker Done yet? Faster and more Accurate-end-of-Utterance Detection Using Prosody", Seventh International Conference on Spoken Language Processing, 2002.

(Continued)

*Primary Examiner* — Jialong He

(57) ABSTRACT

A plurality of utterances of a first user from the language of the first user is translated into a language of a second user. The confidence scores associated with the translated utterances are compared with a confidence threshold. A predetermined utterance gap is adjusted based on the comparison. The predetermined utterance gap is a duration of time that occurs between utterances.

20 Claims, 12 Drawing Sheets

(56) References Cited

U.S. PATENT DOCUMENTS

| | | |
|---|---|---|
| 6,952,665 B1 | 10/2005 | Shimomura |
| 8,284,960 B2 | 10/2012 | Vaudrey |
| 8,515,749 B2 | 8/2013 | Stallard |
| 9,552,354 B1 | 1/2017 | Seligman |
| 2002/0169592 A1 | 11/2002 | Aityan |
| 2003/0115059 A1 | 6/2003 | Jayaratne |
| 2004/0039912 A1 | 2/2004 | Borrowman |
| 2004/0073423 A1 | 4/2004 | Freedman |
| 2004/0111272 A1 | 6/2004 | Gao |
| 2004/0122677 A1 | 6/2004 | Lee |
| 2004/0172257 A1 | 9/2004 | Liqin |
| 2004/0243392 A1 | 12/2004 | Chino |
| 2004/0258301 A1 | 12/2004 | Payton |
| 2005/0276114 A1 | 12/2005 | Tsunekazu |
| 2005/0283365 A1 | 12/2005 | Mizutani |
| 2006/0013409 A1 | 1/2006 | Desloge |
| 2007/0016401 A1 | 1/2007 | Ehsani |
| 2007/0043567 A1 | 2/2007 | Gao |
| 2008/0077390 A1 | 3/2008 | Nagao |
| 2008/0091407 A1 | 4/2008 | Furihata |
| 2008/0133245 A1 | 6/2008 | Proulx |
| 2008/0208597 A1 | 8/2008 | Chino |
| 2008/0235024 A1 | 9/2008 | Goldberg |
| 2009/0099836 A1 | 4/2009 | Jacobsen |
| 2009/0157410 A1 | 6/2009 | Donohoe |
| 2009/0271178 A1 | 10/2009 | Bodin |
| 2009/0306957 A1 | 12/2009 | Gao |
| 2010/0017212 A1 | 1/2010 | Attwater |
| 2010/0057435 A1 | 3/2010 | Kent |
| 2010/0185432 A1 | 7/2010 | Almagro |
| 2010/0250231 A1 | 9/2010 | Almagro |
| 2011/0158420 A1 | 6/2011 | Hannah |
| 2011/0238407 A1 | 9/2011 | Kent |
| 2011/0296342 A1 | 12/2011 | Mantri |
| 2012/0010873 A1* | 1/2012 | Kim .................. G06F 40/58 704/9 |
| 2012/0035908 A1 | 2/2012 | Lebeau |
| 2012/0070128 A1 | 3/2012 | Kato |
| 2012/0078608 A1 | 3/2012 | Waibel |
| 2012/0281009 A1 | 11/2012 | Jia |
| 2012/0314944 A1 | 12/2012 | Ninan |
| 2013/0064462 A1 | 3/2013 | Ninan |
| 2014/0337007 A1 | 11/2014 | Waibel |
| 2014/0358516 A1 | 12/2014 | Lin |
| 2015/0016735 A1 | 1/2015 | Kikuchi |
| 2015/0134320 A1 | 5/2015 | Rangarajan Sridhar |
| 2015/0201222 A1 | 7/2015 | Mertens |
| 2015/0347399 A1 | 12/2015 | Aue |
| 2015/0363389 A1 | 12/2015 | Zhang |
| 2016/0085747 A1 | 3/2016 | Kamatani |
| 2016/0301959 A1 | 10/2016 | Oh |
| 2017/0048561 A1 | 2/2017 | Oh |

OTHER PUBLICATIONS

Gotoh, et al "Sentence Boundary Detection in Broadcast Speech Transcripts", Proc. of the International Speech Communication Associate (ISCA) Workshop: Automatic Speech Recognition: Challenges for the New Millenium (ASR-2000), pages, Paris, Sep. 2000.
Hariharan, R. et al "Robust End-of-Utterance Detection for Real-Time Speech Recognition Applications", IEEE International Conference on Acoustics, Speech, and Signal Processing, Proc. vol. 1, IEEE, 2001.

* cited by examiner

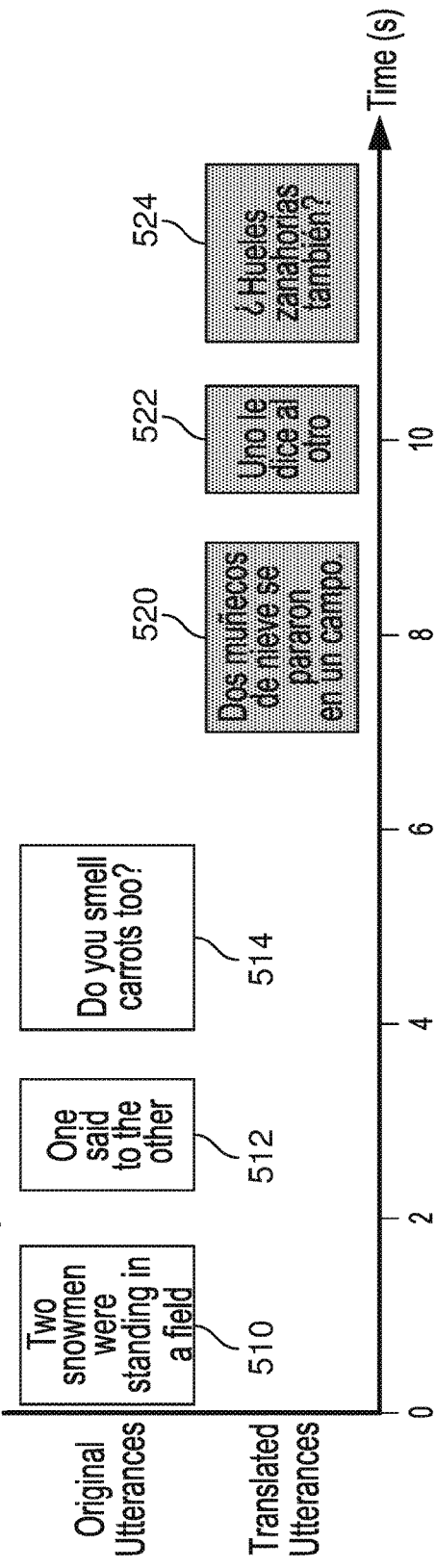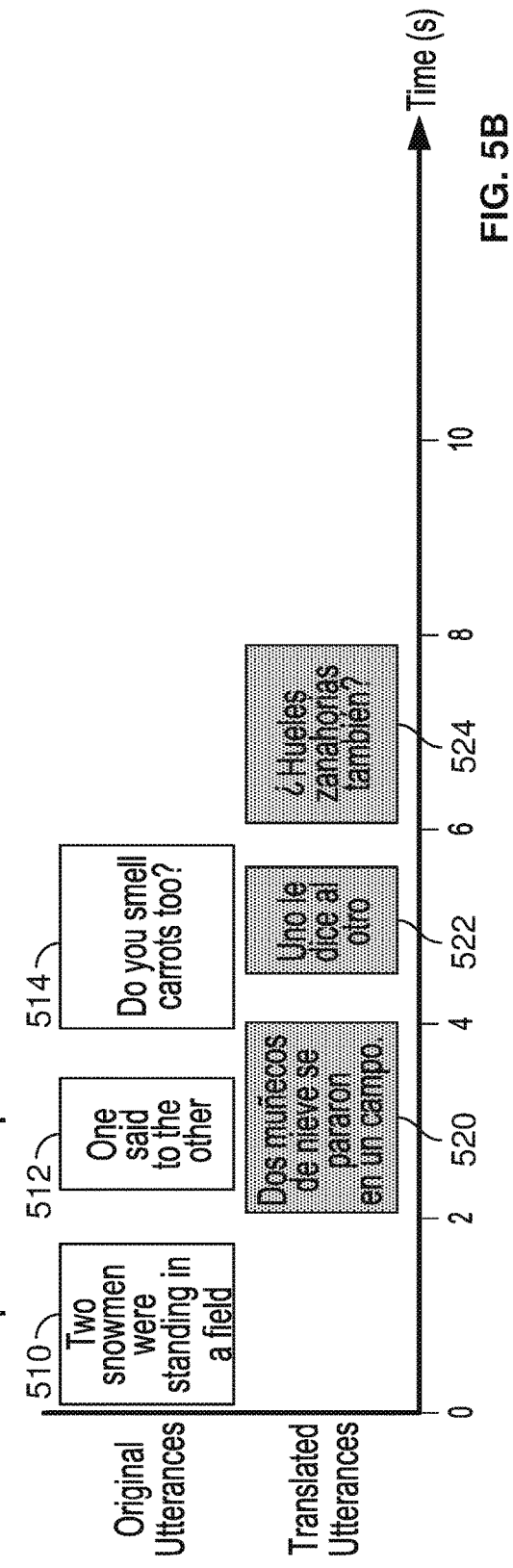
FIG. 5A
FIG. 5B

TRANSLATION TECHNIQUES WITH ADJUSTABLE UTTERANCE GAPS

CROSS REFERENCE TO OTHER APPLICATIONS

This application is a continuation of U.S. patent application Ser. No. 15/650,561, filed Jul. 14, 2017, which is a continuation of U.S. patent application Ser. No. 15/277,897, filed Sep. 27, 2016, now U.S. Pat. No. 9,747,282, issued Aug. 29, 2017, both of which are incorporated herein by reference in their entireties.

BACKGROUND OF THE INVENTION

Using machine translation software to aid a person in having a conversation in a different language is a time consuming process. Each listener must wait for a speaker to complete a sentence, for a processor to translate the sentence, and then for the translated sentence to be outputted. Before responding, the listener must process and understand the translated sentence. Subsequently, the roles are reversed; the listener becomes the speaker and the speaker becomes the listener, and the process is repeated. Such a process can make conversations longer than needed and make the conversation feel mechanical and unnatural. It would be useful to create a system that improves the manner in which people speaking different languages are able to conduct a conversation.

BRIEF DESCRIPTION OF THE DRAWINGS

Various embodiments of the invention are disclosed in the following detailed description and the accompanying drawings.

FIG. 5A is a diagram of an example of a conversation pattern without conversational overlap.

FIG. 5B is a diagram of an example of a conversation pattern with sequential overlap.

DETAILED DESCRIPTION

Figure 1:
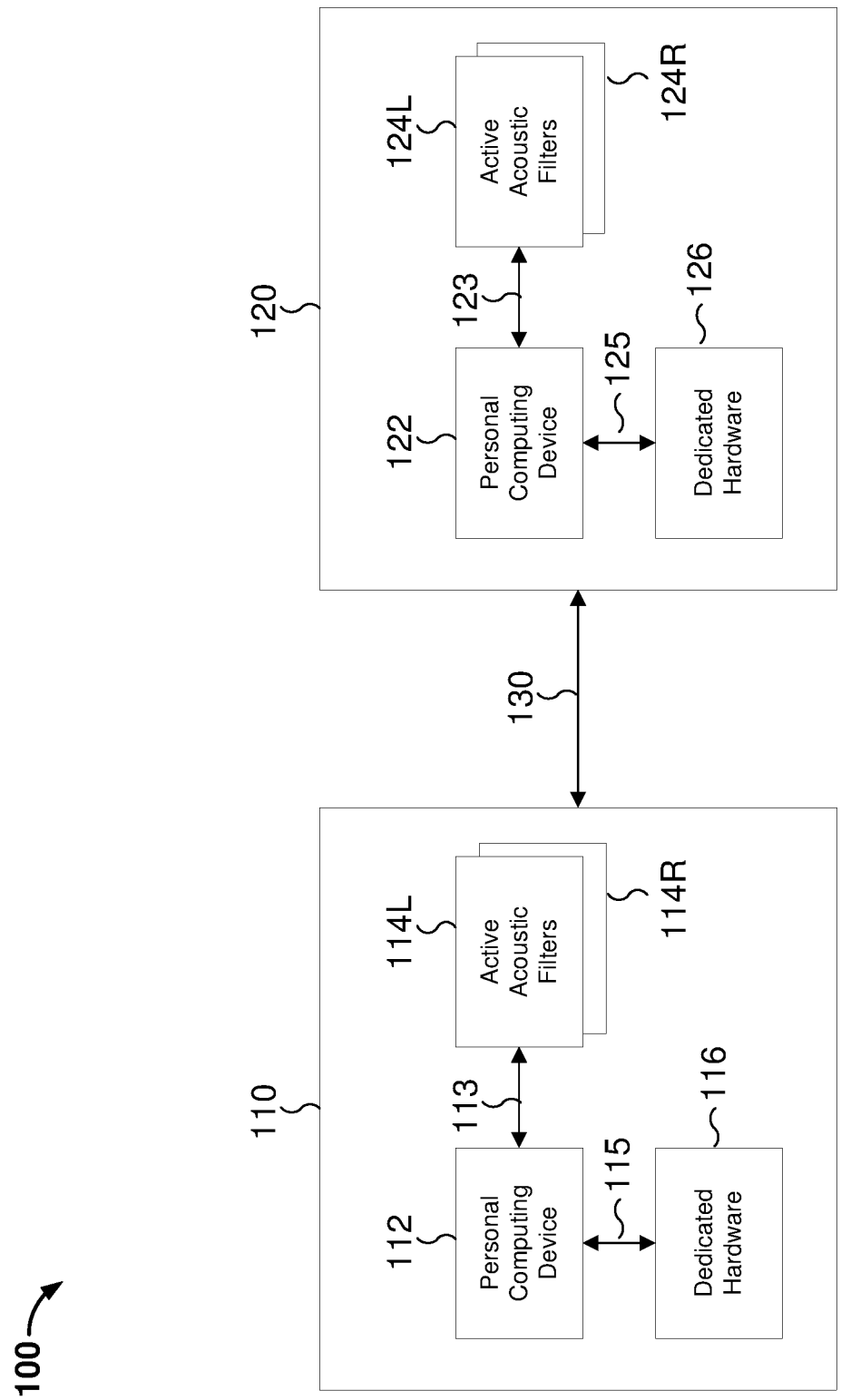
FIG. 1 is a diagram showing an embodiment of a system for translation with conversational overlap.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Machine translation with conversational overlap is disclosed. Machine translation of different languages causes the conversation to be excessively time consuming because typically each speaker must finish his or her turn before a listener is able to hear the translated utterances. Subsequently, the roles are reversed; the listener speaks utterances and the speaker must wait until the listener finishes his turn before the speaker hears translated utterances. An utterance is a series of spoken words followed by a duration of silence. A turn is a series of utterances spoken together, followed by a duration of silence. This back-and-forth process converts what normally would be a quick conversation between two people if they spoke the same language into a longer conversation between the two people merely because they do not speak the same language. To decrease the duration of the conversation, the machine translator could output the translation as soon as it finishes translating a portion of the speaker's utterance, however, this may cause the listener to be confused because the listener is hearing two utterances at the same time (an utterance in a first language and the translated utterance in a second language).

Using the techniques disclosed herein, the system receives an utterance in a first language and translates the utterance into a language associated with the listener. When a portion of the utterance in the first language is capable of being translated, the system outputs a corresponding translated utterance to the listener while the speaker is still speaking. Preferably, the system occludes the listener from hearing the utterance in the first language while allowing the listener to hear the translated utterance. This technique improves the conversation experience because the parties to a conversation that speak different languages will be able to conduct a conversation without significant delay and the parties are unlikely to be confused by hearing two utterances at the same time.

FIG. 1 is a diagram showing an embodiment of a system for translation with conversational overlap. In the example shown, the translation system 100 includes a first personal audio system 110 (speaker/listener) and a second personal audio system 120 (listener/speaker). The first personal audio system 110 and the second personal audio system 120 are connected to each other via a wireless connection 130. The translation system 100 may include additional personal audio systems for additional parties of a conversation.

The translation system 100 may have different configurations. For example, the system may only include the personal audio system 110. The user of the personal audio system 110 may hear translated utterances via the active acoustic filters 114L, 114R and the parties to the conversation may hear translated utterances via a speaker of the personal computing device 112.

The system may also include the personal audio system 110 and a personal computing device 122 without the active acoustic filters 124L, 124R. Instead of active acoustic filters 124L, 124R, the personal computing device 122 is connected via a wired or wireless connection to a pair of earbuds that include a microphone.

In other embodiments, the system includes personal computing device 112 without the active acoustic filters 114L, 114R and a personal computing device 122 without the active acoustic filters 124L, 124R. Instead of being connected to a pair of active acoustic filters, each personal computing device 112, 122 is connected via a wired or wireless connection to a pair of earbuds that include a microphone.

In other embodiments, the system includes active acoustic filters 114L, 114R without the personal computing device 112 and active acoustic filters 124L, 124R without the personal computing device 122.

In the example shown, the first personal audio system 110 includes a personal computing device 112 and a pair of active acoustic filters 114L, 114R. The first personal audio system 110 optionally includes dedicated hardware 116 to assist personal computing device 112 in translating an utterance of a speaker. The personal computing device 112 may be a smart phone, a mobile phone, a tablet, a personal data assistant, a laptop, or any other mobile computing device. The personal computing device 112 is connected to the active acoustic filters 114L, 114R via a wireless connection 113, such as Bluetooth®, WiFi®, ZigBee®, or any other wireless Personal Area Network protocol. Because language translation is computationally intensive and requires sufficient amounts of memory, the dedicated hardware 116 may be implemented to assist the personal computing device 112 in translating the digital spoken utterance into a digital translated utterance. The dedicated hardware 116 may be a device with RAM and a CPU, such as a compute stick (e.g., Intel® compute stick). The dedicated hardware 116 is connected to personal computing device 112 via a wired or wireless connection 115.

The second personal audio system 120 includes a personal computing device 122 and a pair of active acoustic filters 124L, 124R. The second personal audio system 120 optionally includes dedicated hardware 126 to assist personal computing device 122 in translating an utterance of a speaker. The personal computing device 122 may be a smart phone, a mobile phone, a tablet, a personal data assistant, a laptop, or any other mobile computing device. The personal computing device 122 includes one or more processors and memory. The personal computing device 122 is connected to the active acoustic filters 124L, 124R via a wireless connection 123, such as Bluetooth®, WiFi®, ZigBee®, or any other wireless Personal Area Network protocol. The dedicated hardware 126 may be a device with RAM and a CPU, such as a compute stick (e.g., Intel® compute stick). The dedicated hardware 126 is connected to personal computing device 122 via a wired or wireless connection 125.

A personal computing device may identify a language associated with a speaker by applying a combination of statistics and dictionaries to an utterance. Alternatively, the personal computing device may identify the language associated with the speaker by receiving an indication associated with the speaker's language that labels a language associated with the utterance. For example, the personal computing device may receive data associated with an utterance that includes an indication that the utterance was spoken in a first language (e.g., Spanish, French, Italian, Mandarin, etc.) The indication may be part of a header or the payload of a received data packet. The personal computing device may also identify the language associated with the speaker by performing an initial communication with another personal computing device where language information is exchanged between the two devices. For example, a first personal computing device receives a data packet from a second personal computing device that indicates a user of the second personal computing device speaks a particular language. The personal computing device may also identify the language associated with the speaker by receiving via a user interface of the personal computing device a user input identifying the language associated with the speaker. The personal computing device may request an input from a user of the personal computing device of a language associated with the speaker. Alternatively, the personal computing device may have a settings feature where a user of the personal computing device may input the language associated with the speaker.

The personal computing device may identify a language associated with a user of the personal computing device by receiving a manual input from the user of the personal computing device that indicates the language of the user, by applying a combination of statistics and dictionaries to an utterance of the user, or by inspecting an operating system or one or more applications installed on the personal computing device and associating a language of the operating system or one or more applications with a language of the user.

The personal audio system 110 can receive an utterance in a first language. In some embodiments, the utterance is a spoken utterance from a user of personal audio system 120. The spoken utterance is received at external microphones of the active acoustic filters 114L, 114R. The ambient sound environment of the personal audio system 110 may include other sounds and disturbances (e.g., other people speaking, sirens, background music, crying baby, etc.). These sounds and disturbances may be received with the spoken utterance at the external microphones. Poor detection of spoken utterances results in poor translations of those spoken utterances. To improve the quality of the translations, the external microphones of the active acoustic filters 114L, 114R may be focused in a direction of the user of personal audio device 120 and/or a user of personal audio system 110. For example, the external microphones may be arranged and used to capture primarily the voice of the user, the voice of the user's conversation partner, the ambient audio environment, or some combination of the above, all at once or in turns. The external microphones may be a semi-personal microphone, a fully personal microphone, a hybrid open air/personal microphone, or a beamforming microphone array that focuses on a direction of a speaker of the spoken utterance. The active acoustic filters 114L, 114R each digitize the analog spoken utterance and each transmit the digital spoken utterance to the personal computing device 112.

The personal computing device 112 receives the digital spoken utterance, converts the digital spoken utterance into text, identifies a language associated with the digital spoken utterance, and translates the text into a language associated with a user of the personal audio system 110. Statistics and dictionaries may be used to identify the language associated with the digital spoken utterance. The language associated with the digital spoken utterance may be inputted to the personal computing device before the personal computing device 112 receives the digital spoken utterance. The language associated with the user of the personal audio system 110, i.e., the language to which the text is translated, may be determined from an input received from a user of the personal computing device that identifies a language of the first utterance. The language associated with the user of the personal audio system 110 may be determined based on a language associated with an operating system or one or more applications installed on the personal computing device. For example, the language associated with the operating system is in Spanish. The personal computing device determines the language associated the spoken utterance to be Spanish. Subsequently, the personal computing device 112 transmits the translated utterance to the active acoustic filters 114L, 114R, which in turn, output the translated utterance via speakers of the active acoustic filters 114L, 114R.

During the translation process, the personal audio system 110 may receive one or more subsequent spoken utterances. In response to receiving the subsequent spoken utterances, the active acoustic filters 114L, 114R occlude the user of active acoustic filters 114L, 114R from hearing the subsequent spoken utterances, digitize the spoken subsequent utterances, and transmit the digital spoken subsequent utterances to the personal computing device 112 for translation. The degree to which the spoken utterances are occluded is adjustable. The spoken utterance may be partially occluded or completely occluded. In some embodiments, each processor of the active acoustic filters 114L, 114R converts the digital spoken utterance into text, identifies a language associated with the digital spoken utterance, translates the text into a language associated with a user of the personal audio system 110, and directly outputs the translated utterance to a user of the active acoustic filters 114L, 114R without the need of personal computing device 112 performing the translation. Personal audio system 120 operates in a similar manner.

In other embodiments, the utterance is data associated with a spoken utterance. The data associated with the spoken utterance may comprise a digital spoken utterance and an indication of a language associated with the spoken utterance. The indication may be part of the digital spoken utterance or separate data, e.g., a data packet in the header or payload of the digital spoken utterance. The data associated with the spoken utterance is received at the personal computing device 112 from personal audio system 120 via wireless connection 130. The wireless connection 130 may be Bluetooth®, WiFi®, ZigBee®, or any other wireless Personal Area Network protocol. Alternatively, the wireless communication 130 may use a cellular telephone data protocol, such as 2G, 3G, and 4G cellular data protocols. In some embodiments, the data associated with the spoken utterance is received at the active acoustic filters 114L, 114R, which in turn, transmit the data associated with the spoken utterance to the personal computing device 112. The personal computing device 112 converts the digital spoken utterance into text, identifies a language associated with the data associated with the spoken utterance based on the indication of a language associated with the spoken utterance (e.g., a data packet in the header or payload of the digital spoken utterance), and translates the text into a language associated with a user of the personal computing device 112. The language associated with the digital spoken utterance may be inputted to the personal computing device before the personal computing device 112 receives the digital spoken utterance. The language associated with the user of the personal audio system 110, i.e., the language to which the text is translated, may be determined from an input received from a user of the personal computing device that identifies a language of the first utterance. The language associated with the user of the personal audio system 110 may be determined based on a language associated with an operating system or one or more applications installed on the personal computing device. For example, the language associated with the operating system is in Spanish. The personal computing device determines the language associated the spoken utterance to be Spanish. The indication of a language associated with the spoken utterance may indicate the utterance is in Spanish. The language associated with a user of the personal audio system 110 is English. The personal computing device 112 may translate the utterance from Spanish into English. Subsequently, the personal computing device 112 transmits the translated utterance to the active acoustic filters 114L, 114R, which in turn, output the translated utterance via speakers of the active acoustic filters 114L, 114R. Determining the language associated with the data associated with spoken language based on the indication is computationally more efficient that using statistics and referencing dictionaries to determine the language because it uses less processing resources to determine the language associated with the data associated with the spoken utterance.

During the translation process, the active acoustic filters 114L, 114R may receive one or more spoken utterances. In response to receiving the spoken utterances, the active acoustic filters 114L, 114R occlude the user of active acoustic filters 114L, 114R from hearing the spoken utterances. The degree to which the spoken utterances are occluded is adjustable. The spoken utterance may be partially occluded or completely occluded. In some embodiments, each processor of the active acoustic filters 114L, 114R receives the data associated with a spoken utterance, converts the digital spoken utterance of the data associated with the spoken utterance into text, identifies a language associated with the data associated with the spoken utterance based on the indication of a language associated with the spoken utterance (e.g., a data packet in the header or payload of the digital spoken utterance), translates the text into a language associated with a user of the personal computing device 112, and outputs the translated utterance. Personal audio system 120 operates in a similar manner.

In other embodiments, the utterance is a spoken utterance from a user of personal audio system 110. The spoken utterance is received at external microphones of the active acoustic filters 114L, 114R. When a user of the personal audio system 110 speaks, the personal audio system 110 determines that the user of the personal audio system is speaking because sound is detected by an internal microphone of the active acoustic filters 114L, 114R while the spoken utterance is received at the external microphones of the active acoustic filters 114L, 114R. The ambient sound environment of the personal audio system 110 may include other sounds and disturbances (e.g., other people speaking, sirens, background music, crying baby, etc.). These sounds and disturbances may be received with the spoken utterance at the external microphones. Poor detection of spoken utterances results in poor translations of those spoken utterances. To improve the quality of the translations, the external microphones of the active acoustic filters 114L, 114R may be focused in a direction of the user of personal audio device 110. For example, the external microphones may be arranged and used to capture primarily the voice of the user, the voice of the user's conversation partner, the ambient audio environment, or some combination of the above, all at once or in turns. The external microphones may be a semi-personal microphone, a fully personal microphone, a hybrid open air/personal microphone, or a beamforming microphone array that focuses on a direction of the user of personal audio system 110. The active acoustic filters 114L, 114R each digitize the analog spoken utterance to create data associated with a spoken utterance and each transmit the data associated with the spoken utterance to the personal computing device 112. The personal computing device 112 receives the data associated with the spoken utterance, and transmits the data associated with the spoken utterance to personal audio system 120 via wireless connection 130. The data associated with the spoken utterance includes an indication of a language associated with the user of personal audio system 110. The indication may be determined from a user-specified setting stored in memory, a language associated with an operating system or one or more applications installed on the personal computing device, or determined by the processor using statistics and dictionaries to identify the language of the user. In some embodiments, the active acoustic filters 114L, 114R transmit the data associated with the spoken utterance to personal audio system 120 via wireless connection 130. Personal audio system 120 operates in a similar manner.

Figure 2:
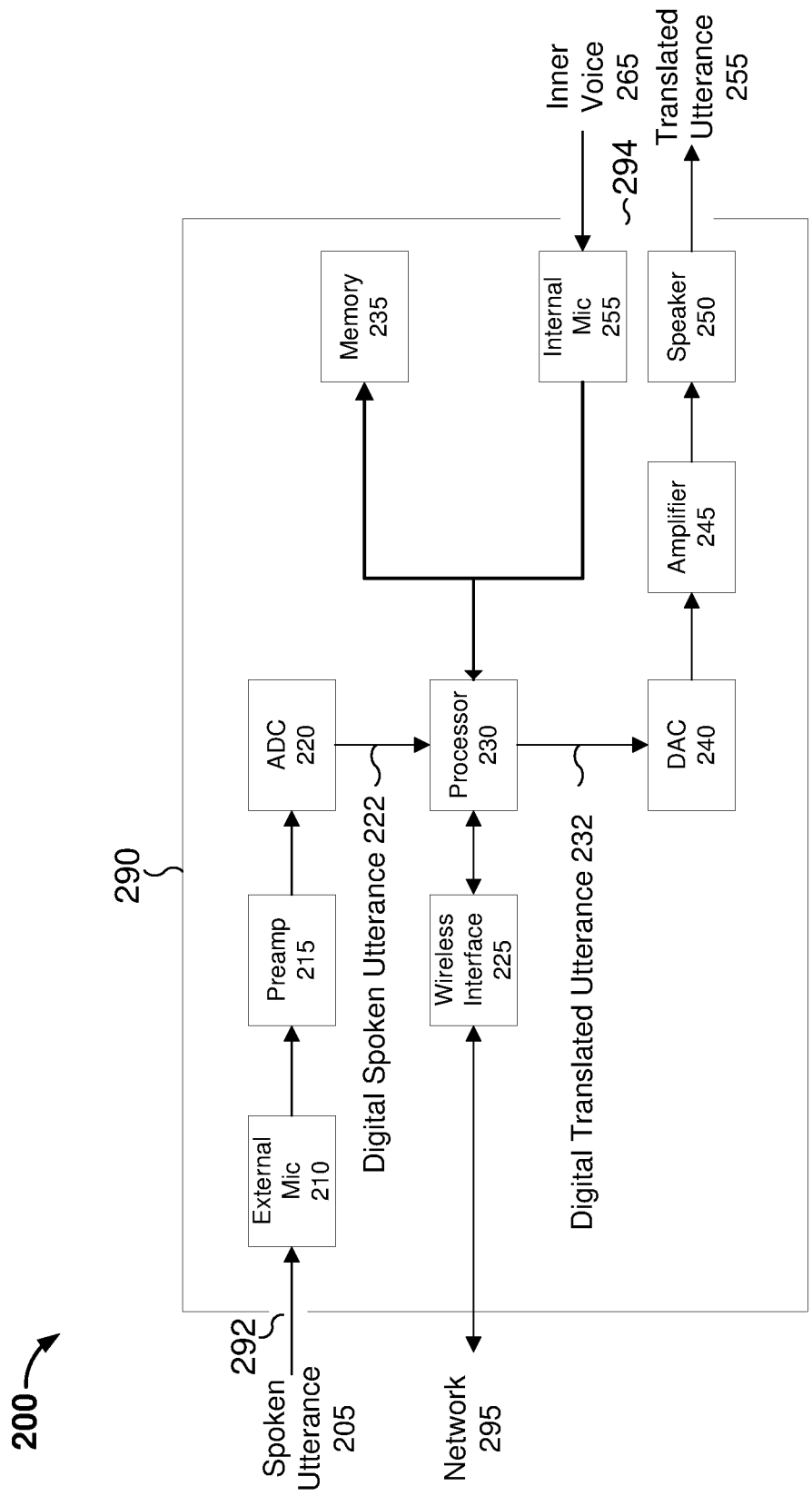
FIG. 2 is a block diagram of an embodiment of an active acoustic filter.

FIG. 2 is a block diagram of an embodiment of an active acoustic filter 200, which may be the active acoustic filter 114L or the active acoustic filter 114R. In the example shown, the active acoustic filter 200 includes an external microphone 210, a preamplifier 215, an analog-to-digital converter (ADC) 220, a wireless interface 225, a processor 230, a memory 235, a digital-to-analog converter (DAC) 240, an amplifier 245, a speaker 250, an internal microphone 255, and a battery (not shown), all of which may be contained within a housing 290. The active acoustic filter 200 may receive via external microphone 210 a spoken utterance 205 in a first language and output via speaker 250 a translated utterance 255 in a second language. The ambient sound environment of the active acoustic filter 200 may include other sounds and disturbances (e.g., other people speaking, sirens, background music, crying baby, etc.). These sounds and disturbances may be received with the spoken utterance 205 at the external microphone 210.

The housing 290 may be configured to interface with a user's ear by fitting in, on, or over the user's ear such that the spoken utterance 205 in a first language is mostly excluded from reaching the user's ear canal and the translated utterance 255 in a second language generated by the personal computing device is provided directly into the user's ear canal. The housing 290 may have a first aperture 292 for accepting the spoken utterance 205 in a first language and a second aperture 294 to allow the translated utterance 255 in a second language to be output into the user's outer ear canal and to allow an inner voice 265 to be detected and captured. The inner voice 265 is the sound of one's own voice, conducted through bone and flesh, and transmitted through vibrations back into the air of one's own ear canal. In some embodiments, the housing 290 is an earbud. An earbud housing has a portion that fits within or against the user's outer ear canal. An earbud housing may have other portions that fit within the concha or pinna of the user's ear.

The external microphone 210 converts the spoken utterance 205 into an electrical signal that is amplified by preamplifier 215 and converted into a digital spoken utterance 222 by ADC 220. The external microphone 210 may be one or more transducers for converting sound into an electrical signal that is sufficiently compact for use within the housing 290. The preamplifier 215 may be configured to amplify the electrical signal output from the external microphone 210 to a level compatible with the input of the ADC 220. In some embodiments, the preamplifier 215 is integrated into the ADC 220, which, in turn, is integrated with the processor 230. In some embodiments, each acoustic filter contains more than one microphone and a separate preamplifier for each corresponding microphone. The ambient environment in which parties to a conversation are conversing may have other sources of sound, which in turn, may be part of the spoken utterance 205. These extraneous sounds may cause a poor translation of the spoken utterance. To reduce the number of translation errors, the external microphone 210 may be a semi-personal microphone, a fully personal microphone, a hybrid open air/personal microphone, or a beamforming microphone array that focuses on a direction of a speaker of the spoken utterance 205. The external microphone may be arranged and used to capture primarily the voice of the user, the voice of the user's conversation partner, the ambient audio environment, or some combination of the above, all at once or in turns. Beamforming is a signal processing technique that relies on spatial and acoustic information in order to achieve spatial selectivity and directionality. A single omnidirectional microphone offers no directionality because it responds equally to sounds coming from any direction. However, multiple microphones can be configured in an array separated by a known distance to form a directional response or beam pattern. The combination of a microphone array and a beamforming filter is more sensitive to sounds coming from a first direction than sounds coming from one or more other directions. Various array configurations may be implemented in a beamforming microphone array, including, but not limited to broadside arrays, which sum together the microphone signals, as well as differential endfire arrays, which sum together a front microphone signal with a delayed and inverted signal from the rear microphone.

The ADC 220 digitizes the output from the preamplifier 215 by converting the output from the preamplifier 215 into a series of digital spoken utterances at a rate that is at least twice the highest frequency present in the spoken utterance. The resolution of the digital spoken utterance 222 (i.e., the number of bits in each audio sample) may be sufficient to minimize or avoid audible sampling noise in the translated utterance 255.

The digital spoken utterance 222 may be processed by processor 230 and transmitted via wireless interface 225 to a personal computing device over network 295. Alternatively, the digital spoken utterance 222 is converted to text by the processor 230, the text is translated by processor 230 into a language associated with a user of the personal computing device, and the digital translated utterance 232 is provided to DAC 240. The processor may include one or more processing devices, such as a microcontroller, a microprocessor, and/or a digital signal processor. The processor 230 can include and/or be coupled to the memory 235. The memory 235 may store software programs, which may include an operating system and translation software to translate utterances, for execution by the processor 230. A software program may include a head-related transfer function (HRTF) that can spatialize the translated utterance in a direction that the spoken utterance 205 was received. The memory 235 may store data for use by the processor 230. The data stored in the memory 235 may include a user's listening preferences and/or rules and processing parameters to apply to a received spoken utterance from the user's ear.

Examples of user listening preferences include, but are not limited to, include: the translated utterances are spaced apart to match an utterance gap of the utterances, the translated utterances are outputted to match a speech pattern of the speaker, the translated utterances are outputted to match a cadence of the speaker, the translated utterances are outputted and spatialized in a direction that the spoken utterance was received, the translated utterances are to be heard at a user's preferred audio spatial location of the translated utterance, etc.

Spatializing refers to altering an audio source such that a sound appears to be coming from a particular direction or from a larger distance away or a closer distance. For example, sound may be spatialized by delaying a sound for one ear slightly behind another and altering the higher frequency content to change positioning in the axial plane, altering the frequency content over time by adding a slight reverb, by adding a slight reverb to the overall audio, by changing the reverb characteristics such that the ratio of direct to perceived "reflected" sound is altered to be more-closely like that of sound from a specific distance, or by changing the relative frequency content of the direct sound compared to the perceived reflected sound and by imposing a complex frequency response modeled on the pinnae to alter the perception of the angle of incidence of the sound in three dimensions.

Rule and processing parameters to apply to a received spoken utterance may include parameters to suppress annoyance noises. Examples of annoyance noises include, but are not limited to, sounds of engines or motors, crying babies, and sirens, or any other sound in an ambient sound environment of active acoustic filters besides the voice of the user of the active acoustic filters and a voice of a person with whom the user of the active acoustic filters is speaking. These annoyances may be included in the spoken utterance signal 205. The presence of these annoyances may cause a translation of the digital spoken utterance to be of poor quality. The frequencies of the fundamental and harmonic components of the annoyance noise may be identified and suppressed using a set of narrow band-reject filters designed to attenuate those frequencies while passing other frequencies (presumably the frequencies of the speaker). The processor 230 includes a filter bank that includes two or more band reject filters to attenuate or suppress a fundamental frequency component and at least one harmonic component of the fundamental frequency of an annoyance noise included in the digital spoken utterance 222.

In the event an inner voice signal 265 is received at internal mic 255 while spoken utterance 205 is received at external mic 210, the processor 230 determines that the spoken utterance is from a user of the active acoustic filter 200 and the digital spoken utterance 222 includes an indication that the user of the active acoustic filter 200 spoke the spoken utterance 205. In the event an inner voice signal 265 is not received at internal mic 255 while spoken utterance 205 is received at external mic 210, the processor 230 determines that the spoken utterance is from a different user and the digital spoken utterance 222 does not include the indication that the user of the active acoustic filter 200 spoke the spoken utterance 205. The wireless interface 225 provides the active acoustic filter 200 with a connection to one or more wireless networks 295 (e.g., wireless connection 113) using a limited-range wireless communications protocol, such as Bluetooth®, WiFi®, ZigBee®, or any other wireless personal area network protocol. Upon receiving the digital spoken utterance, the personal computing device is configured to translate the digital spoken utterance into a digital translated utterance. In the event the digital spoken utterance includes the indication that the user of the active acoustic filter 200 spoke the spoken utterance, then the personal computing device is configured to transmit data associated with the spoken utterance to another personal audio system.

After the personal computing device translates the digital spoken utterance into a digital translated utterance, the processor 230 receives via wireless interface 225 the digital translated utterance.

The digital translated utterance 232 is converted into an analog signal by DAC 240. The processor 230 may output the digital translated utterance 232 as a series of samples, but not necessarily at the same rate as the digital spoken utterance 222 is generated by the ADC 220. The analog signal is amplified by amplifier 245 and converted into analog translated utterance 255 by speaker 250. An amount that amplifier 245 amplifies the analog signal may be adjusted by a user. The amplifier 245 may be integrated into the DAC 240, which, in turn, may be integrated with the processor 230. The speaker 250 can be any transducer for converting an electrical signal into a sound that is suitably sized for use within the housing 290. The speaker is located within a user's ear canal such that translated utterance 255 is the primary sound that a user of the active acoustic filter hears.

When no conversation overlap is selected by a user of the active acoustic filter, the digital spoken utterance 222 is provided from the processor 230 to the DAC 240. The analog spoken utterance is provided to amplifier 245 and converted into an analog spoken utterance by speaker 250. An amount that amplifier 245 amplifies the analog spoken utterance may be adjusted by a user. The analog spoken utterance outputted by speaker 250 allows a user of the active acoustic filter to hear the rhythm and flow to which a person in the different language speaks.

The battery (not shown) provides power to the various elements of the active acoustic filter 200. The battery may be a zinc-air battery, a lithium ion battery, a lithium polymer battery, a nickel cadmium battery, or a battery using some other technology.

Figure 3:
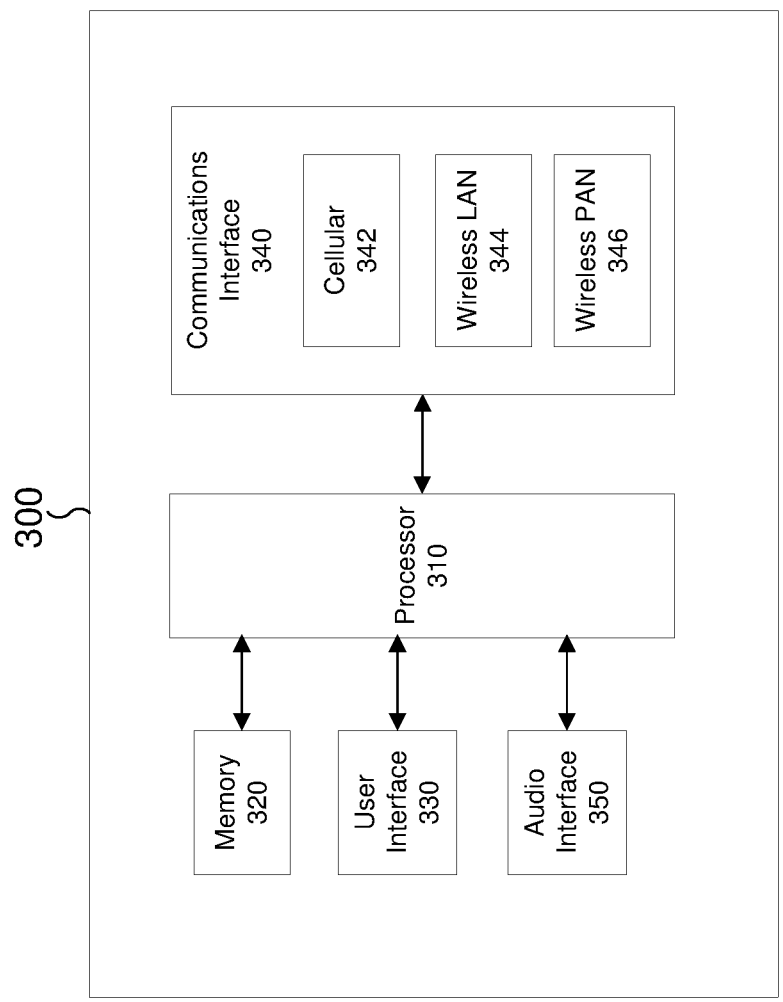
FIG. 3 is a block diagram of an embodiment of a personal computing device.

FIG. 3 is a block diagram of an embodiment of a personal computing device 300, which may be the personal computing device 112. In the example shown, the personal computing device 300 includes a processor 310, memory 320, a user interface 330, a communications interface 340, and an audio interface 350.

The processor 310 may include one or more microprocessors, microcontrollers, digital signal processors, application specific integrated circuits (ASICs), or a system-on-a-chip (SOC).

In some embodiments, in response to receiving data associated with a spoken utterance, the processor 310 converts the data associated with a spoken utterance into text, identifies a language associated with the data associated with the spoken utterance, and translates the text into a language associated with a user of the personal computing device 300.

The data associated with a spoken utterance includes a digital spoken utterance and an indication of a language associated with data of the spoken utterance. The indication may be included as a data packet in the header of the data or as a data packet in the payload of the data.

In some embodiments, in response to receiving a digital spoken utterance from the active acoustic filters, the processor 310 determines whether an indication that the spoken utterance is from the user of the personal audio system is included with the digital spoken utterance. In the event the indication is included with the digital spoken utterance, the processor transmits the digital spoken utterance with the indication to another personal audio system. In the event the indication is not included with the digital spoken utterance, the processor converts the digital spoken utterance into text, identifies a language associated with the digital spoken utterance, and translates the text into a language associated with a user of the personal computing device. The memory 320 may include a combination of volatile and/or nonvolatile memory including read-only memory (ROM), static, dynamic, and/or magneto resistive random access memory (SRAM, DRAM, MRAM, respectively), and nonvolatile writable memory, such as flash memory.

The memory 320 may store software programs and routines for execution by the processor, such as translation software to translate utterances. These stored software programs may include an operating system such as Apple® or Android® operating systems. The operating system may include functions to support the communications interface 340, such as protocol stacks, coding/decoding, compression/decompression, and encryption/decryption. The stored software programs may include an application or "app" to cause the personal computing device to perform portions of the processes and functions described herein. A software program may include a head-related transfer function (HRTF) that can spatialize the translated utterance in a direction that the spoken utterance was received. The memory 320 may store data for use by the processor 310.

The data stored in the memory 320 may include a user's listening preferences and/or rules and processing parameters to apply to a received spoken utterance from the user's ear. A user listening preference may include: the translated utterances are spaced apart to match an utterance gap of the utterances, the translated utterances are outputted to match a speech pattern of the speaker, the translated utterances are outputted to match a cadence of the speaker, the translated utterances are outputted and spatialized in a direction that the spoken utterance was received, the translated utterances to be heard are at a user's preferred audio spatial location of the translated utterance, etc. The data stored at memory 320 may also include data associated with translation accuracy.

The user interface 330 may include a display and one or more input devices, such as a touch screen. A user of the personal computing device may input a language of a speaker, a language translation preference (e.g., the user wants all utterances to be translated into English), a spatialization preference (e.g., the user wants to hear all translated utterances to appear as if they are coming from above the user's right ear), and a conversation overlap preference (e.g., overlap vs. no overlap). Translation with sequential conversation overlap is the default preference. The user may also be provided with an interface to adjust the volume of an ambient sound environment of the personal audio system (includes the spoken utterance) and a volume of the translated utterance heard by the user. For example, the user may adjust the volume by attenuating or boosting the sounds (individual or overall) of the ambient sound environment (e.g., the voice of a speaker, background music, or crowd noise, etc.), adjust the volume of the translated utterance (e.g., to match a volume of the ambient sound environment, to be heard over all other ambient sounds, etc.), lower the volume of the ambient sound environment relative to the volume of the translated utterance so as to better-hear the translated utterance, and selectively lower or increase the volume of aspects of the ambient sound or the translated utterance.

The communications interface 340 includes at least an interface for wireless communications with external devices. For example, the communications interface 340 may receive a digital spoken utterance signal from an active acoustic filter. The communications interface 340 may also transmit a digital translated utterance signal to the active acoustic filter. The communications interface 340 may also transmit a digital spoken utterance with an indication of the user's language to an external device. The communications interface 340 may include one or more of a cellular telephone network interface 342, a wireless Local Area Network (LAN) interface 344, and/or a wireless personal area network (PAN) interface 336. The cellular telephone network interface 342 may use one or more of the known 2G, 3G, and 4G cellular data protocols. The wireless LAN interface 344 may use the WiFi® wireless communication protocol or another wireless local area network protocol. The wireless PAN interface 346 may use a limited-range wireless communication protocol, such as Bluetooth®, Wi-Fi®, ZigBee®, or some other public or proprietary wireless personal area network protocol.

The audio interface 350 may be configured to input and output sound. The audio interface 350 may include one or more microphones, preamplifiers, and A/D converters that perform similar functions as the microphone 210, preamplifier 215, and ADC 220 of the active acoustic filter 200. The microphones may be part of a pair of ear buds that are wired or wirelessly connected to the personal computing device 300. For example, a pair of ear buds may convert the spoken utterance into an electrical signal, which is then amplified by a preamplifier and converted into a digital spoken utterance by an ADC. The digital spoken utterance is converted into text and is translated by processor 310 into a language associated with a user of the personal computing device.

The audio interface 350 may include one or more DACs, amplifiers, and speakers that perform similar functions as the DAC 240, amplifier 245, and speaker 250 of the active acoustic filter 200. In some embodiments, the audio interface 350 receives the spoken utterance and provides a digital spoken utterance signal to the processor 310, which in turn translates the digital spoken utterance signal into a language associated with a user of the personal computing device 300. Subsequently, the communications interface 340 transmits the digital translated utterance to each of the digital acoustic filters, which in turn output the translated utterance while occluding the user of the active acoustic filters from hearing the spoken utterance and any subsequent spoken utterances.

In some embodiments, the audio interface 350 is configured to output a translated utterance in the language that was inputted via user interface 330. The digital translated utterance is converted into an analog signal by a DAC, the analog signal is amplified by an amplifier, and outputted as an analog translated utterance by a speaker of the audio interface 350.

Figure 4:
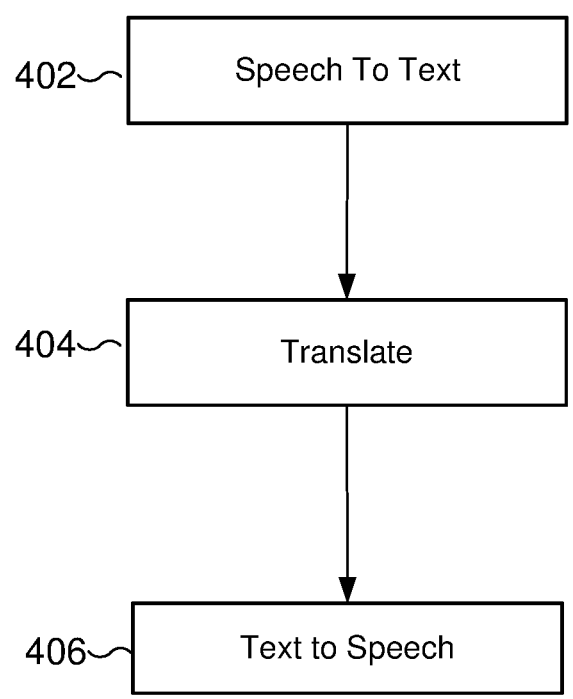
FIG. 4 is a flow chart illustrating an embodiment of machine translation of live conversation.

FIG. 4 is a diagram illustrating an embodiment of machine translation of live conversation. In some embodiments, the process 400 of FIG. 4 is executed by a system, such as personal audio system 110 or personal audio system 120. The process may be performed by the active acoustic filters 114L, 114R, the personal computing device 112, or dedicated hardware 116, or any combination of the active acoustic filters 114L, 114R, the personal computing device 112, and the dedicated hardware 116.

At 402, a digital spoken utterance is converted to text. The digital spoken utterance may be a spoken utterance that was received at a microphone and converted into a digital signal by an analog-to-digital converter. Alternatively, the digital spoken utterance may be data associated with a spoken utterance that is received at a personal audio system. The digital spoken utterance is converted to text using speech-to-text software, such as Nuance Dragon®

At 404, the text is translated from the language associated with the digital spoken utterance into a language associated with the user of the personal audio system. The translation is performed by translation software.

At 406, the translated text is synthesized into a digital signal suitable for conversion to an analog signal by a digital-to-analog converter. For example, the translated text is converted into an analog signal by the DAC 240 of active acoustic filter 200.

Figure 5C:
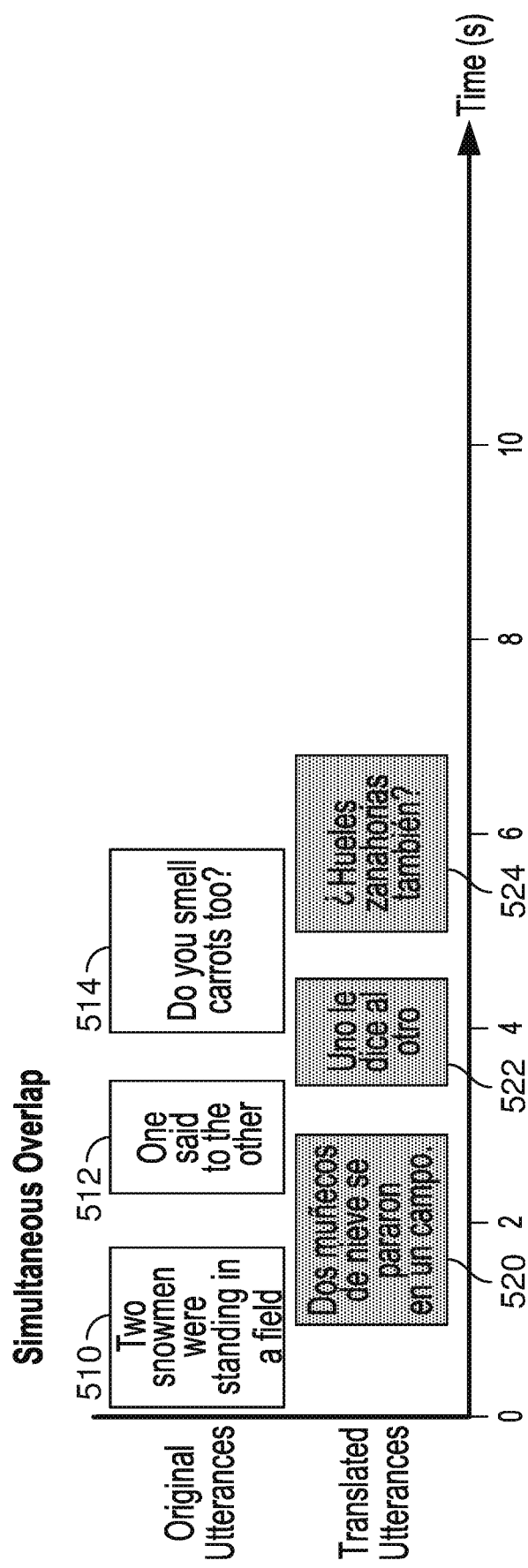
FIG. 5C is a diagram of an example of a conversation pattern with simultaneous overlap.

FIGS. 5A, 5B, and 5C are diagrams illustrating examples of conversation patterns. The diagrams illustrate that the duration of a conversation without conversational overlap during translation is significantly longer than the duration of a conversation with conversational overlap during translation.

FIG. 5A is a diagram of an embodiment of a conversation pattern where there is no conversational overlap. In the example shown, a speaker speaks utterances 510, 512, 514 that are spoken in a first language. Utterances are determined to be separate utterances in the event an utterance gap is greater than an utterance threshold, e.g., 200 ms. The speaker is determined to be finished speaking, i.e., end of speaking turn, after the utterance gap is greater than a turn threshold, e.g., 500 ms. After the speaker has finished speaking utterance 514, and the utterance gap is greater than both the utterance threshold and the turn threshold, the listener hears translated utterances 520, 522, 524 that are spoken in a second language.

As seen in the example, there is no overlap between what is said by a speaker and what is heard by a listener. A speaker first speaks utterance 510 "Two snowmen were standing in a field," then utterance 512 "One said to the other," and subsequently utterance 514 "Do you smell carrots too?" A personal audio system may receive the spoken utterance or data associated with the spoken utterance and provide translated utterances 520, 522, 524. A user of the personal audio system first hears translated utterance 520 "Dos muñecos de nieve se pararon en un campo.", then translated utterance 522 "Uno le dice al otro," and subsequently translated utterance 524 "¿Hueles zanahorias también?"

No conversation overlap between a spoken utterance in a first language and a translated utterance in a second language is an example of a user listening preference. The personal audio system may switch between conversation overlap (sequential or simultaneous) and no conversation overlap based on a user input to either the active acoustic filters (e.g., a physical tap on the active acoustic filters, pressing a button on the active acoustic filters) or the personal computing device (e.g., a selectable user interface option). Providing a listener with the option of no conversation overlap allows the listener to hear the rhythm and flow to which a person in the different language speaks. In some embodiments, only the listener of a conversation has a personal audio system. For example, a person may be on vacation in a foreign country and is trying to learn the language. Learning a new language is difficult because people speaking in the foreign language usually speak at a rate that is too fast for the listener to understand. No conversation overlap allows the person to hear the foreign language and to hear a translation of the foreign language. After hearing the translation, the person is in a better position to practice his or her speaking skills by responding in the foreign language because the person has a better understanding of what was said.

FIG. 5B is a diagram of an embodiment of a conversation pattern where there is sequential overlap. Sequential overlap is an example of a user listening preference. In the example shown, a speaker speaks utterance 510. After the speaker finishes utterance 510, but before the speaker begins to speak utterance 512, the listener begins to hear translated utterance 520. Overlap occurs between utterances 512, 514 and translated utterances 520, 522, but the listener does not hear the translated utterance until after the first utterance 510 is completed. In contrast to the example of FIG. 5A, the listener hears translated utterances 520, 522 while the speaker speaks utterances 512, 514. Listening to translated utterances and spoken utterances at the same time can be confusing. To prevent the listener from being confused, the active acoustic filters occlude the listener, both physically and electronically, from hearing the spoken utterances 512, 514. The active acoustic filters physically occlude the listener from hearing the spoken utterances 512, 514 by having a housing that is configured to interface with the listener's ear by fitting in or over the user's ear such that a spoken utterance is mostly excluded from reaching the user's ear canal. The shape of the active acoustic filters when inserted into a user's ear prevents a majority of the spoken utterance from being heard by the user. The active acoustic filters also electronically occlude the listener from hearing the spoken utterances 512, 514 by attenuating the spoken utterances and directly providing the translated utterances generated by the active acoustic filter into the listener's ear canal.

FIG. 5C is a diagram of an embodiment of a conversation pattern where there is simultaneous overlap. In the example shown, a speaker speaks utterance 510. As soon as a portion of the utterance 510 is capable of being translated into a language associated with the user of the personal audio system, the portion is translated and the listener hears a translated utterance 520 that corresponds to the portion that was translated. Similar to sequential overlap, the listener hears translated utterances 520, 522, 524 while the speaker speaks utterances 510, 512, 514. Listening to translated utterances and spoken utterances at the same time can be confusing. To prevent the listener from being confused, the active acoustic filters occlude the listener, both physically and electronically, from hearing the spoken utterances 510, 512, 514. The active acoustic filters physically occlude the listener from hearing the spoken utterances 510, 512, 514 by having a housing that is configured to interface with the listener's ear by fitting in or over the user's ear such that a spoken utterance is mostly excluded from reaching the user's ear canal. The shape of the active acoustic filters when inserted into a user's ear prevents a majority of the spoken utterance from being heard by the user. The active acoustic filters electronically occlude the listener from hearing the spoken utterances 510, 512, 514 by attenuating the spoken utterances and directly providing the translated utterances generated by the active acoustic filter into the listener's ear canal.

As seen in FIG. 5C, an utterance gap exists between utterances 510 and 512 as well as utterances 512 and 514. An utterance gap that is larger than a predetermined threshold (e.g., 250 ms) is used to determine whether a second utterance is part of a first utterance or a separate utterance. In the event the utterance gap is less than or equal to the predetermined threshold, then the second utterance is a part of the first utterance. In the event the utterance gap is more than the predetermined threshold, then the second utterance is a separate utterance. For example, if the predetermined threshold is 250 ms, spoken utterance 512 is determined to be a separate utterance if the utterance gap between the words "field" and "One" is greater than 250 ms.

A user listening preference may include a setting such that in the event the utterance gap is less than the predetermined threshold, the utterance gap between a first part of a translated utterance and a second part of a translated utterance is capable of being adjusted to match the utterance gap between a first part of a spoken utterance and the second part of the spoken utterance. For example, a speaker may speak a first part of the utterance 510 "Two snowmen" followed by an utterance gap that is less than a predetermined threshold (e.g., 100 ms), followed by a second part of the utterance 510 "were standing in a field." The translated utterance 520 may match the manner in which utterance 510 was spoken by the speaker by including the utterance gap that is less than the predetermined threshold between a first part of the translated utterance and a second part of the translated utterance.

A user listening preference may also include a setting such that the utterance gap between translated utterances is set to match the utterance gap between spoken utterances. For example, the utterance gap between translated utterance 520 and translated utterance 522 is capable of being adjusted to match the utterance gap between utterance 510 and utterance 512. The utterance gap between translated utterances 524 and 522 is also capable of being adjusted to match the utterance gap between utterances 514 and 512.

A user listening preference may also include a setting such that a translated utterance is not heard by a user unless a translation of a spoken utterance is greater than or equal to a confidence score. For example, a spoken utterance may be given a translation confidence score indicating an accuracy of the translation. In the event a translation of the spoken utterance is less than a confidence level, the spoken utterance may be combined with a subsequent utterance and the combined utterance is translated. In the event the combined utterance is greater than or equal to the confidence level, then the listener hears the translated utterance. In the event the combined utterance is less than the confidence level, then the combined utterance is combined with a subsequent utterance and the process repeats until a maximum condition is satisfied. The maximum condition prevents an infinite number of utterances from being combined together. The maximum condition may be a maximum number of utterances (e.g., a maximum of three utterances may be combined), a maximum end-of-turn gap has been exceeded (e.g., 500 ms), or a maximum amount of elapsed time (e.g., 1 s).

Statistical analysis may be performed on an accuracy of the translated utterances. In the event a percentage of translated utterances was less than a confidence threshold, the utterance gap may be adjusted. For example, if 100 spoken utterances were received and 25% of the translations were less than a confidence threshold, the utterance gap may be adjusted so that more words are included in the utterance to give the translation software more context to translate the spoken utterance.

When utterances contain an utterance gap that is smaller than the predetermined threshold, the parts of the single utterance could be translated separately to see if their individual translation confidence scores exceed that of the full utterance. For example, a speaker may speak a first part of the utterance 510 "Two snowmen" followed by an utterance gap that is less than a predetermined threshold (e.g., 100 ms), followed by a second part of the utterance 510 "were standing in a field." A translation confidence score of the first part and a translation confidence score of the second part could, individually, be greater than a translation confidence score of the combined parts. In this situation, the utterance gap may be adjusted to improve the accuracy of the translation.

The personal audio system may learn a speech pattern of the speaker. For example, a speaker may speak with dramatic pauses causing a single spoken utterance to be identified as two separate utterances. A translation of each separate utterance may provide a confidence score that is higher than a predetermined confidence threshold, however, when the separate utterances are combined into a single utterance, the translation of the combined utterance provides a confidence score that is higher than the separate utterances. In this scenario, the personal audio system combines the two separate utterances into a single utterance and outputs a single translated utterance. The personal audio system may output translated utterances to match a speech pattern of the speaker.

A speaker may speak with a particular cadence. The personal audio system may output translated utterances to match a cadence of the speaker. For example, a normal speaker in English may be able to speak 100 words per minute. A normal speaker in Spanish may be able to speak 130 words per minute. There may not be a one-to-one word correspondence between the words that are spoken and the words that are heard. However, the speed at which someone hears a translated utterance reflects the rate at which someone would normally hear that language. For example, if a person is speaking Spanish at an above average rate (e.g., 140 words per minute), a person will hear the translated Spanish in English at a rate (e.g., 108 words per minute) that is proportional to the above average rate in Spanish.

Figure 6:
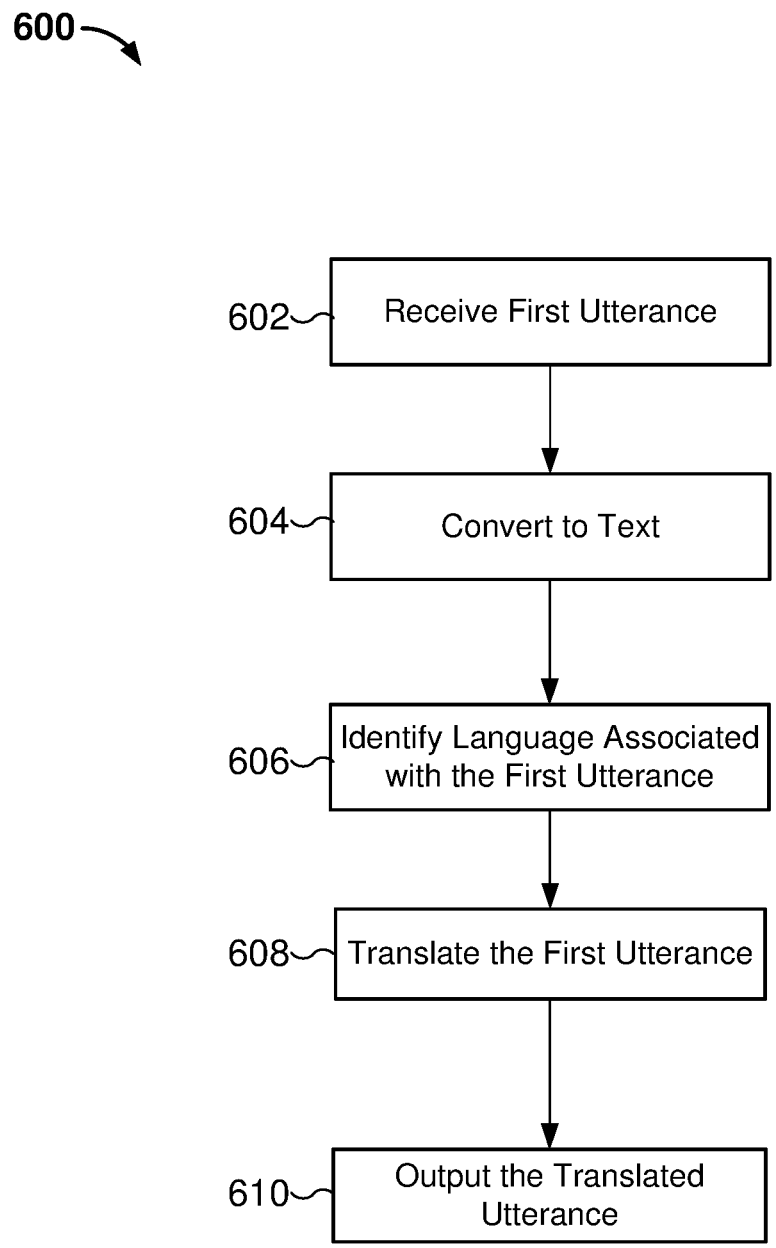
FIG. 6 is a flow chart depicting an embodiment of a process for translating utterances with conversational overlap.

FIG. 6 is a flow chart depicting an embodiment of a process for translating utterances with conversational overlap. In some embodiments, the process 600 of FIG. 6 is executed by a system, such as personal audio system 110 or personal audio system 120.

At 602, a first utterance is received at a personal audio system. In some embodiments, the first utterance is a spoken utterance. The spoken utterance is digital by an active acoustic filter. The digital spoken utterance is provided to a personal computing device.

In other embodiments, the first utterance is data associated with a spoken utterance. Data associated with the spoken utterance is received at the personal computing device. Alternatively, the data associated with a spoken utterance is received at the active acoustic filters and provided to the personal computing device.

At 604, the digital spoken utterance or data associated with the spoken utterance is converted into text.

At 606, a language associated with the first utterance is identified. The personal computing device may analyze the first utterance (digital spoken utterance or data associated with the spoken utterance) using translation software to identify a language associated with the first utterance. The personal computing device may receive an indication that identifies the language associated with the first utterance. The personal computing device may exchange language information with another personal computing device. The personal computing device may receive an input from a user of the personal computing device that identifies a language of the first utterance.

At 608, the text is translated into a language associated with the user of the personal audio system. The language associated with the user of the personal audio system is established via a user interface of the personal computing device. The language associated with the user is selectable. For example, the user of the personal audio system may be multilingual and select the utterances to be translated into any of the languages to which the user understands. For example, the first utterance is associated with Spanish. The user understands English and French. The user may select the first utterance to be translated from Spanish into English or into French.

At 610, the translated utterance is outputted to the user of the personal audio system. The personal computing device transmits a digital translated utterance to the active acoustic filters. The active acoustic filters convert the digital translated utterance into an analog translated utterance and output the analog translated utterance into an ear canal of the user. During the process 600, the active acoustic filters occlude the listener, both physically and electronically, from hearing any spoken utterances of the speaker by having a housing that is configured to interface with the listener's ear by fitting in or over the user's ear such that the spoken utterance is mostly excluded from reaching the user's ear canal and by directly providing the translated utterance generated by the active acoustic filter into the listener's ear canal. In some embodiments, the translated utterance may be outputted by a speaker of or headphones connected to a personal computing device.

Figure 7A:
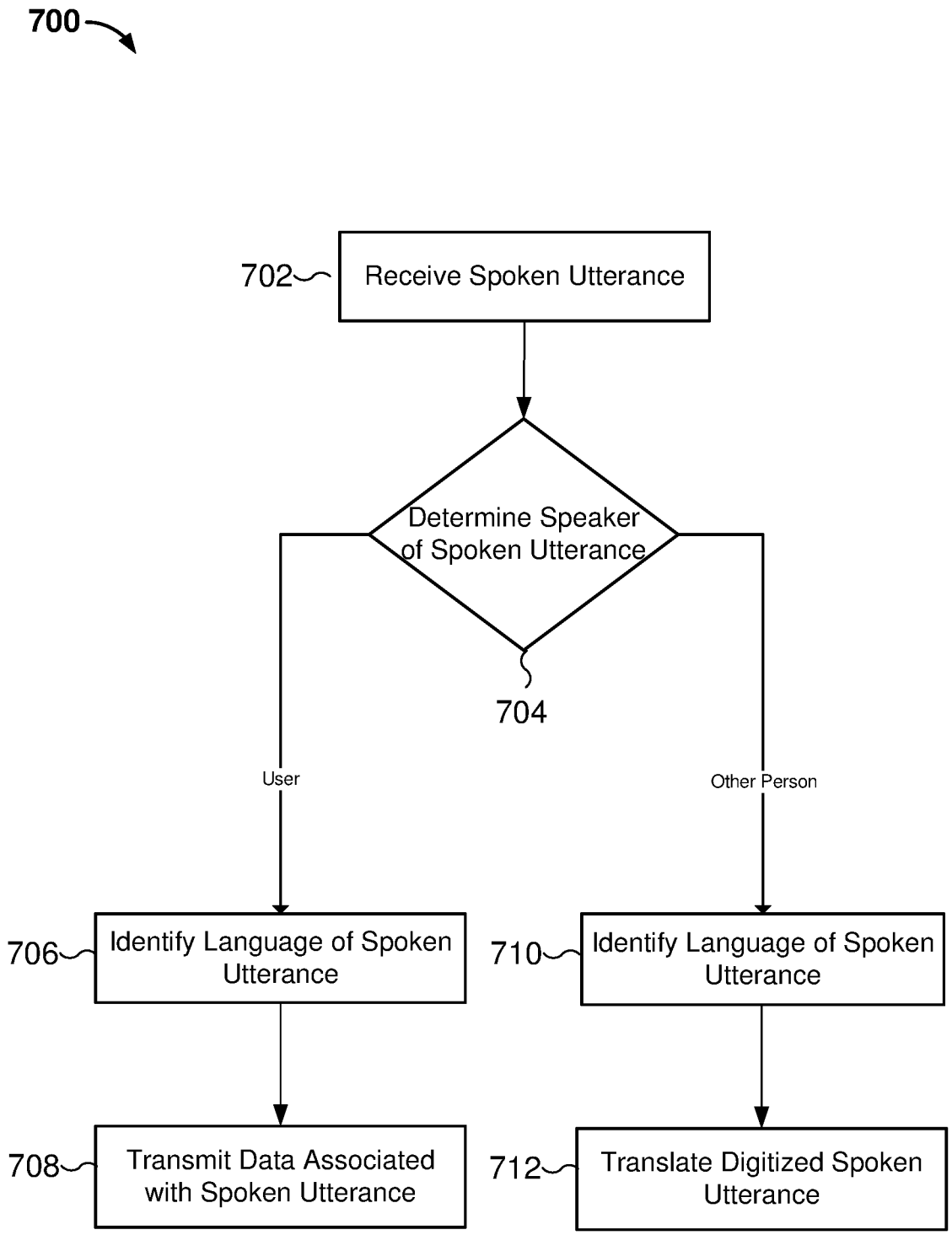
FIG. 7A is a flow chart depicting an embodiment of a process for processing spoken utterances.

FIG. 7A is a flow chart depicting an embodiment of a process for processing spoken utterances. In some embodiments, the process 700 of FIG. 7 is executed by a system, such as personal audio system 110 or personal audio system 120.

At 702, a spoken utterance is received at the personal audio system. The spoken utterance may be received at microphones associated with the active acoustic filters, digitized by the active acoustic filters, and provided to a processor of the personal computing device. Alternatively, microphones associated with the personal computing device may receive the spoken utterance, an ADC of the personal computing device digitizes the spoken utterance, and the processor of the personal computing device receives the digital spoken utterance.

At 704, a speaker of the spoken utterance is determined. The speaker of the spoken utterance may be the user of a personal audio system or a person to whom the user of the personal audio system is speaking.

In the event the speaker of the spoken utterance is the user of the personal audio system, then an internal microphone of an active acoustic filter will receive an inner voice signal while the external microphone of the active acoustic filter receives a spoken utterance signal. The spoken utterance is digitized by the active acoustic filters and the digital spoken utterance is transmitted to the personal computing device and the process proceeds to 706. The digital spoken utterance may be transmitted with an indication that the utterance was spoken by the user of the personal audio system. The transmitted digital spoken utterance may include the indication that the utterance was spoken by the user of the personal audio system and/or include an indication of a language associated with the spoken utterance.

In the event the speaker of the spoken utterance is not the user of the personal audio system (e.g., a person to whom the user of the personal audio system is speaking), then the internal microphone of the active acoustic filter will not receive an inner voice signal while the external microphone of the active acoustic filter receives a spoken utterance signal. The spoken utterance is digitized by the active acoustic filters and the digital spoken utterance is transmitted to the personal computing device and the process proceeds to 710. The digital spoken utterance may be transmitted with an indication of a language associated with the spoken utterance. The transmitted digital spoken utterance may include the indication of a language associated with the spoken utterance.

At 706, a language associated with the spoken utterance is identified by the personal computing device. The personal computing device may analyze the digital spoken utterance using translation software to identify a language associated with the spoken utterance. The personal computing device may receive an indication that identifies the language associated with the first utterance. The personal computing device may receive an input from a user of the personal computing device that identifies a language of the spoken utterance. The personal computing device may determine the language associated with the spoken utterance based on a language associated with an operating system or one or more applications installed on the personal computing device. After the language associated with the spoken utterance is identified, the process proceeds to 708.

At 708, data associated with the spoken utterance is transmitted. The data associated with the spoken utterance includes the digital spoken utterance and may include an indication that indicates a language associated with the spoken utterance. The indication may be part of a header of the transmitted digital spoken utterance or part of the payload of the transmitted digital spoken utterance.

At 710, the spoken utterance is converted to text and a language associated with the spoken utterance is identified by the personal computing device. The personal computing device may analyze the digital spoken utterance using translation software to identify a language associated with the spoken utterance. The personal computing device may receive an indication that identifies the language associated with the first utterance. The personal computing device may receive an input from a user of the personal computing device that identifies a language of the spoken utterance. After the language associated with the spoken utterance is identified, the process proceeds to 712.

At 712, the text is translated into a language associated with the user of the personal audio system. The language associated with the user of the personal audio system is established via a user interface of the personal computing device. The language associated with the user is selectable.

Figure 7B:
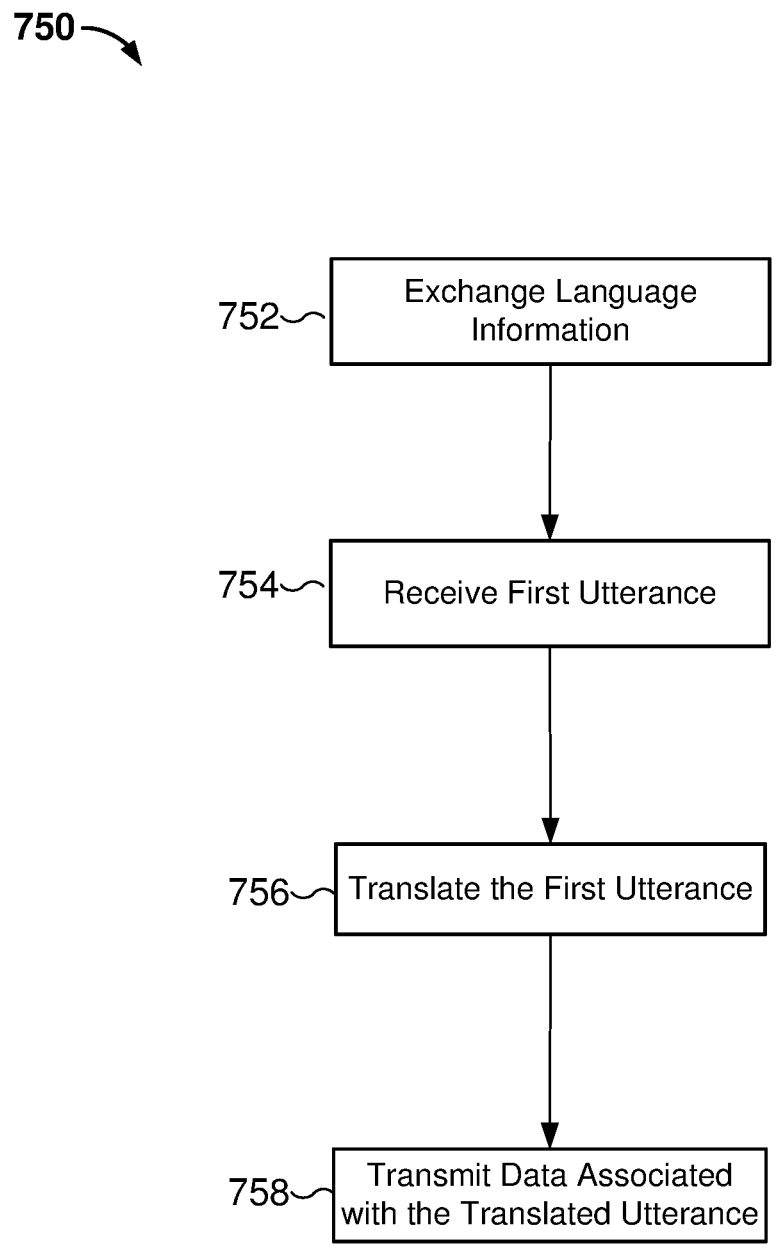
FIG. 7B is a flow chart depicting an embodiment of a process for processing spoken utterances.

FIG. 7B is a flow chart depicting an embodiment of a process for processing spoken utterances. In some embodiments, the process 750 of FIG. 7B is executed by a system, such as personal audio system 110 or personal audio system 120.

At 752, language information between two devices is exchanged. For example, language information associated with a user of a first personal audio system and language information associated with a user of a second personal audio system may be exchanged during an initial connection phase between the two systems.

At 754, a first utterance is received. The spoken utterance may be received at microphones associated with the active acoustic filters, digital by the active acoustic filters, and provided to a processor of the personal computing device. Alternatively, microphones associated with the personal computing device may receive the spoken utterance, an ADC of the personal computing device digitizes the spoken utterance, and the processor of the personal computing device receives the digital spoken utterance.

At 756, the first utterance is converted to text and the text is translated into a language associated with a user of the other device. For example, a first personal audio system translates the first utterance into a language associated with a user of the second personal audio system.

At 758, data associated with the translated utterance is transmitted. For example, a personal audio system transmits data associated with the translated utterance to a second personal audio system. Upon receiving the data associated with the translated utterance, the second personal audio system may output the translated utterance to the user of the second personal audio system.

Figure 8:
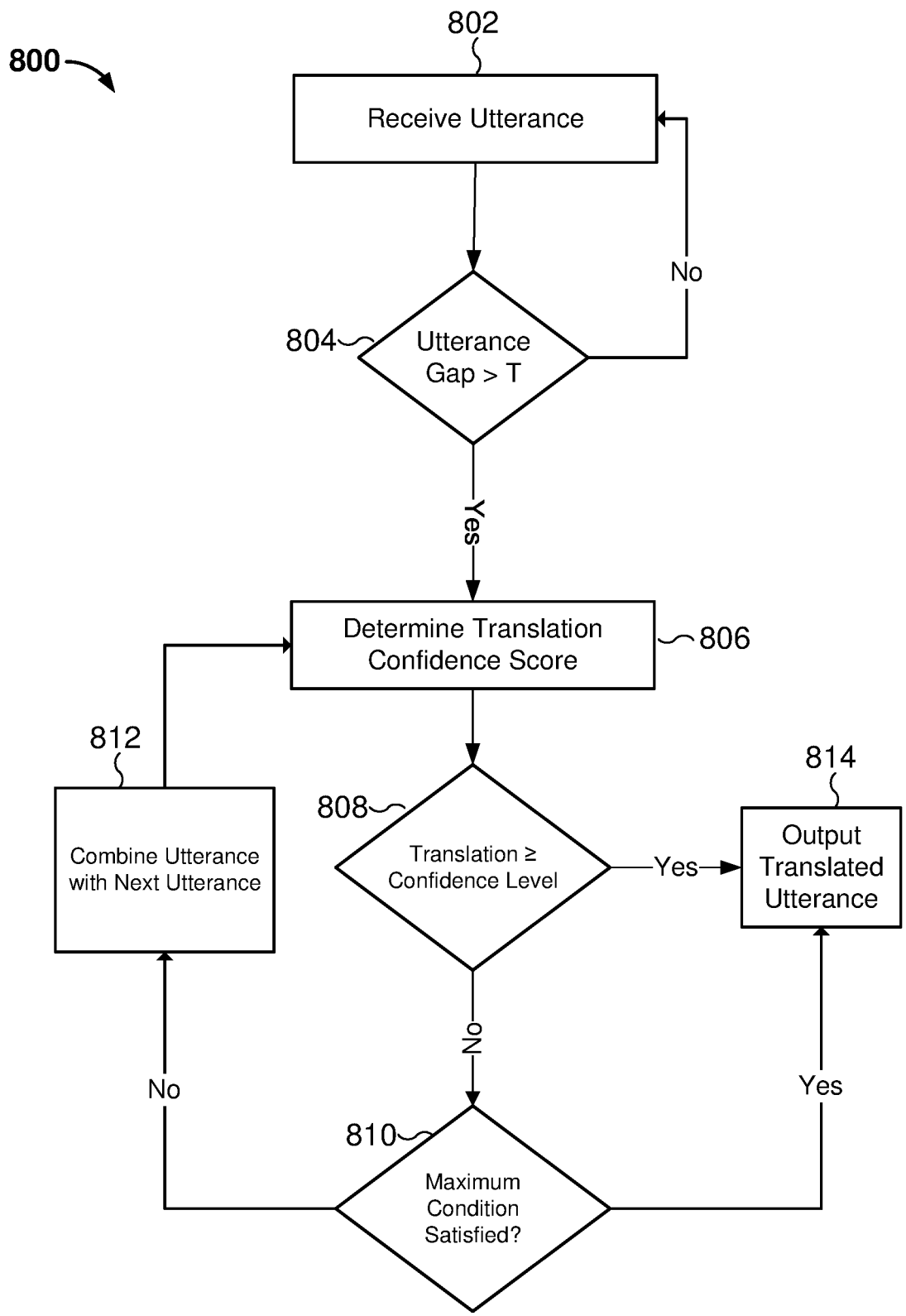
FIG. 8 is a flow chart depicting an embodiment of an adaptive translation process.

FIG. 8 is a flow chart depicting an embodiment of an adaptive translation process. In some embodiments, the process 800 of FIG. 8 is executed by a system, such as personal audio system 110 or personal audio system 120.

At 802, an utterance is received at a personal audio system. The utterance may be a spoken utterance or data associated with a spoken utterance.

At 804, a processor of a personal computing device or active acoustic filters determines whether an utterance gap greater than a threshold exists. An utterance gap is a duration of time after an utterance is completed. In the event the utterance gap is less than the threshold, then the process returns to 802 because the utterance is incomplete. In the event the utterance gap is greater than a threshold, the utterance is provided to the processor of the personal computing device and the process proceeds to 806.

At 806, the processor of the personal computing device translates the utterance and determines a translation confidence score for the translation.

At 808, the processor of the personal computing device determines if the translation confidence score is greater than or equal to a confidence level. The confidence level may be established by a user of the personal audio system or be established by the translation software. In the event the translation confidence score is less than the confidence level, then the process proceeds to 810. In the event the translation confidence score is greater than or equal to the confidence level, then the translation is outputted as a translated utterance at 814.

At 810, the processor of the personal computing device determines if a maximum condition is satisfied. The maximum condition prevents an infinite number of utterances from being combined together. The maximum condition may be a maximum number of utterances (e.g., a maximum of three utterances may be combined), a maximum end-of-turn gap has been exceeded (e.g., 500 ms), or a maximum amount of elapsed time (e.g., 1 s). In the event the maximum condition has not been satisfied, then the process proceeds to 812 where the utterance is combined with the next utterance and the process returns to 806. In the event the maximum condition has been satisfied, then the translation is outputted as a translated utterance at 814.

Figure 9:
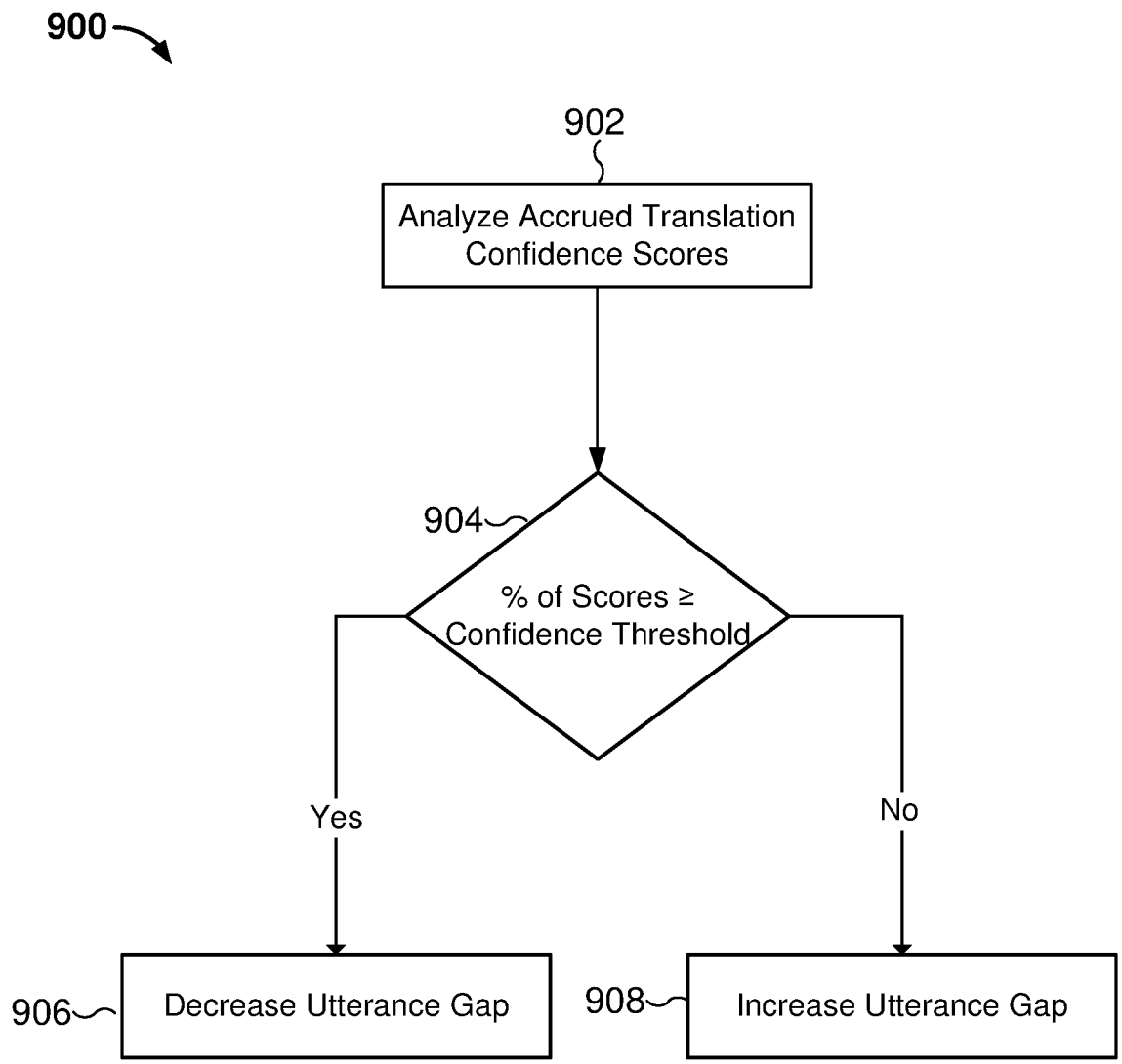
FIG. 9 is a flow chart depicting an embodiment of an adaptive translation process.

FIG. 9 is a flow chart depicting an embodiment of an adaptive translation process. In some embodiments, the process 900 of FIG. 9 is executed by a system, such as personal audio system 110 or personal audio system 120.

At 902, accrued translation confidence scores are analyzed. For example, each time the personal computing device translates an utterance, a translation confidence score is determined and stored in a memory of the personal computing device. The accrued translation confidence scores that are analyzed may be the scores from the past minute, past hour, past day, past week, past month, past year, etc. The accrued translation confidence scores may be speaker specific. For example, the personal computing device may analyze the accrued translation confidence scores associated with a particular speaker. The personal computing device may determine an identity associated with the speaker if the data associated with an utterance includes an identifier of the speaker's device or the actual speaker. The identifier may be stored in memory of the personal computing device and stored in a manner that associates the identifier with translation confidence scores (e.g., relational database).

At 904, the personal computing device determines whether a certain percentage of the translation confidence scores is greater than or equal to a confidence threshold. The confidence threshold is a percentage of translations that are accurate. The certain percentage may be established by the machine translation software or established by a user of the personal computing device. For example, the personal computing device may compare the translation confidence scores from the past five minutes to the confidence threshold.

In the event the certain percentage of the translation confidence scores is greater than or equal to a confidence threshold, then at 906, the duration of the utterance gap is decreased to increase the number of and the rate at which translated utterances are outputted. In the event the certain percentage of the translation confidence scores is less than the confidence threshold, then at 908, the duration of the utterance gap is increased to decrease the number of and the rate at which translated utterances are outputted. For example, the duration of the utterance gap is increased so that more words are included in the utterance. This provides the machine translation software with more context as to the meaning of the utterance. At 906 or 908, the duration of the utterance gap may be adjusted by a fixed duration (e.g., 0.1 sec) or by a fixed percentage (e.g., 10%). In some embodiments, the duration of the utterance gap may be manually adjusted by a user of the personal computing device. For example, the user may subjectively believe that the translated utterances do not make much sense and wants to improve the quality of the translations.

Figure 10:
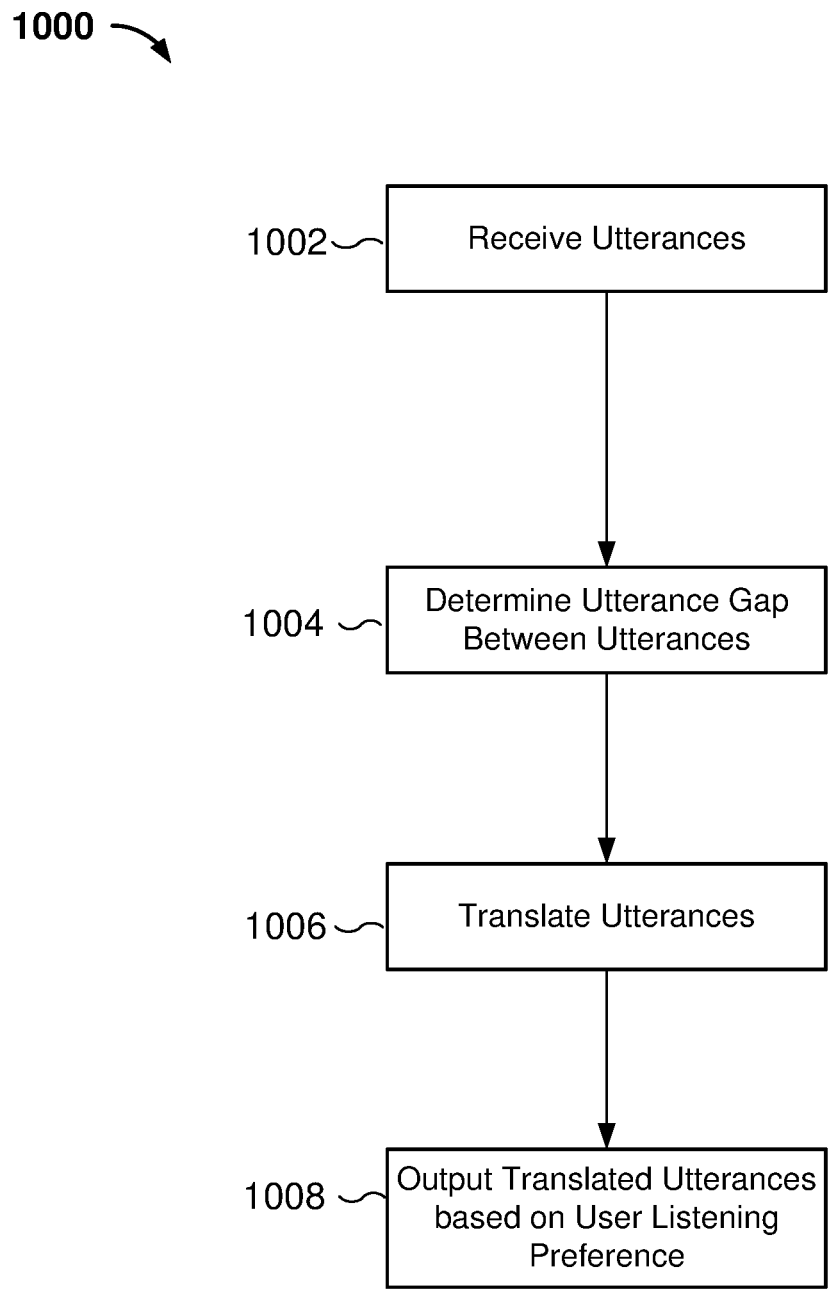
FIG. 10 is a flow chart depicting an embodiment of an adaptive translation process.

FIG. 10 is a flow chart depicting an embodiment of an adaptive translation process. In some embodiments, the process 1000 of FIG. 10 is executed by a system, such as personal audio system 110 or personal audio system 120.

At 1002, a plurality of utterances is received at a personal audio system. The plurality of utterances may be spoken utterances received at active acoustic filters or data associated with spoken utterances received at the active acoustic filters or personal computing device.

At 1004, an utterance gap between each of the plurality of utterances is determined by either the active acoustic filters or the personal computing device. Utterances are determined to be separate and distinct utterances in the event there is a predetermined amount of time after the last word of an utterance without a spoken word.

At 1006, each of the plurality of utterances is translated into a language associated with a user of the personal audio system.

At 1008, the translated utterances are output to the user of the personal audio system based at least in part on a user listening preference. A user listening preference may cause the translated utterances to be spaced apart to match an utterance gap of the utterances. A user listening preference may cause the translated utterances to be outputted to match a speech pattern of the speaker. A user listening preference may cause the translated utterances to be outputted to match a cadence of the speaker. A user listening preference may cause the translated utterances to be outputted and spatialized in a direction that the spoken utterance was received. A user listening preference may cause the translated utterances to be heard at a user's preferred audio spatial location of the translated utterance. For example, the translated utterance may appear to be heard from a direction to the right of the user's right ear, even though a speaker of the utterance is located to the left side of the user's head. A user listening preference may cause the spatialized location of the translated utterance to be adjusted. For example, the spatialized location of the translated utterance may be adjusted from a right side of the user's head to a center or left side of the user's head. The spatialized location of the translated utterance may be adjusted from above the user's head to below or directly in front of the user's head. The user listening preference may cause the translated utterance to sound closer or further to the listener than the actual distance between a speaker and the user. The translated utterance may be heard "front and center" and at an increased volume relative to an ambient sound environment that includes spoken utterances.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a plurality of utterances of a first person in a first language;
   detecting an utterance gap between sequential utterances of the plurality of utterances;
   translating the plurality of utterances from the first language to a second language to produce a plurality of translated utterances;
   determining a translation confidence score for each utterance of the plurality of translated utterances, to produce accrued translation confidence scores for the plurality of utterances;
   determining whether a percentage of the accrued translation confidence scores is:
   less than a confidence threshold; or
   greater than the confidence threshold;
   in accordance with a determination that the percentage of the accrued translation scores is less than the confidence threshold, increasing the utterance gap; and
   in accordance with a determination that the percentage of the accrued translation scores is greater than the confidence threshold, decreasing the utterance gap.

2. The method of claim 1, wherein decreasing the utterance gap results at least in part in increasing a number of translated utterances that are output.

3. The method of claim 1, wherein decreasing the utterance gap results at least in part in increasing a rate at which translated utterances are output.

4. The method of claim 1, wherein increasing the utterance gap results at least in part in decreasing a number of translated utterances that are output.

5. The method of claim 1, wherein increasing the utterance gap results at least in part in decreasing a rate at which translated utterances are output.

6. The method of claim 1, further comprising:
   determining whether the percentage of the accrued translation confidence scores is equal to the confidence threshold; and
   in accordance with a determination that the accrued translation confidence scores is equal to the confidence threshold, decreasing the utterance gap.

7. The method of claim 1, wherein the confidence threshold corresponds to a percentage of accurate translations.

8. A system, comprising:
   a processor configured for:
   receiving a plurality of utterances of a first person in a first language;
   detecting an utterance gap between sequential utterances of the plurality of utterances;
   translating the plurality of utterances from the first language to a second language to produce a plurality of translated utterances;
   determining a translation confidence score for each utterance of the plurality of translated utterances, to produce accrued translation confidence scores for the plurality of utterances;
   determining whether a percentage of the accrued translation confidence scores is:
   less than a confidence threshold; or
   greater than the confidence threshold;
   in accordance with a determination that the percentage of the accrued translation score is less than the confidence threshold, increasing the utterance gap; and
   in accordance with a determination that the percentage of the accrued translation score is greater than the confidence threshold, decreasing the utterance gap.

9. The system of claim 8, wherein the processor is configured for increasing a number of translated utterances that are output in conjunction with decreasing the utterance gap.

10. The system of claim 8, wherein the processor is configured for increasing a rate at which translated utterances are output in conjunction with decreasing the utterance gap.

11. The system of claim 8, wherein the processor is configured for decreasing a number of translated utterances that are output in conjunction with increasing the utterance gap.

12. The system of claim 8, wherein the processor is configured for decreasing a rate at which translated utterances are output in conjunction with increasing the utterance gap.

13. The system of claim 8, wherein the processor is configured for:
   determining whether the percentage of the accrued translation confidence scores is equal to the confidence threshold; and
   in accordance with a determination that the percentage of the accrued translation score is equal to the confidence threshold, decreasing the utterance gap.

14. The system of claim 8, wherein the confidence threshold corresponds to a percentage of accurate translations.

15. A computer program product, the computer program product being embodied in a non-transitory computer readable storage medium and comprising computer instructions for:
   receiving a plurality of utterances of a first person in a first language;
   detecting an utterance gap between sequential utterances of the plurality of utterances;

translating the plurality of utterances from the first language to a second language to produce a plurality of translated utterances;

determining a translation confidence score for each utterance of the plurality of translated utterances, to produce accrued translation confidence scores for the plurality of utterances;

determining whether a percentage of the accrued translation confidence scores is:

less than a confidence threshold; or greater than the confidence threshold;

in accordance with a determination that the percentage of the accrued translation score is less than the confidence threshold, decreasing the utterance gap; and in accordance with a determination that the percentage of the accrued translation score is greater than the confidence threshold, decreasing the utterance gap.

16. The computer program product of claim 15, further comprising computer instructions for increasing a number of translated utterances that are output in conjunction with decreasing the utterance gap.

17. The computer program product of claim 15, further comprising computer instructions for increasing a rate at which translated utterances are output in conjunction with decreasing the utterance gap.

18. The computer program product of claim 15, further comprising computer instructions for decreasing a number of translated utterances that are output in conjunction with increasing the utterance gap.

19. The computer program product of claim 15, further comprising computer instructions for decreasing a rate at which translated utterances are output in conjunction with increasing the utterance gap.

20. The computer program product of claim 15, wherein the confidence threshold corresponds to a percentage of accurate translations.

* * * * *